P. OKEY.
INTERNAL COMBUSTION ENGINE.
APPLICATION FILED MAR. 5, 1910.

988,021.

Patented Mar. 28, 1911.

Witnesses
J. Milton Jester
A. L. Phelps

Inventor
Perry Okey
By C. A. Shepherd.
Attorney

UNITED STATES PATENT OFFICE.

PERRY OKEY, OF COLUMBUS, OHIO, ASSIGNOR OF ONE-HALF TO SARAH LOUISE OKEY, OF COLUMBUS, OHIO.

INTERNAL-COMBUSTION ENGINE.

988,021.　　　　　Specification of Letters Patent.　　Patented Mar. 28, 1911.

Application filed March 5, 1910. Serial No. 547,468.

*To all whom it may concern:*

Be it known that I, PERRY OKEY, a citizen of the United States, residing at Columbus, in the county of Franklin and State of Ohio, have invented certain new and useful Improvements in Internal-Combustion Engines, of which the following is a specification.

This invention relates to internal combustion engines, and more particularly to that class of two cycle engines in which the explosive mixture is compressed in the crank case.

The object of the invention is the provision of improved means for supporting the crank shaft, for packing the crank shaft against leakage, and for increasing the compression by cutting off the various compartments of the crank case from each other, by means of packing disposed between the cylinders of multiple cylinder engines, as will be hereinafter set forth.

Figure 1:
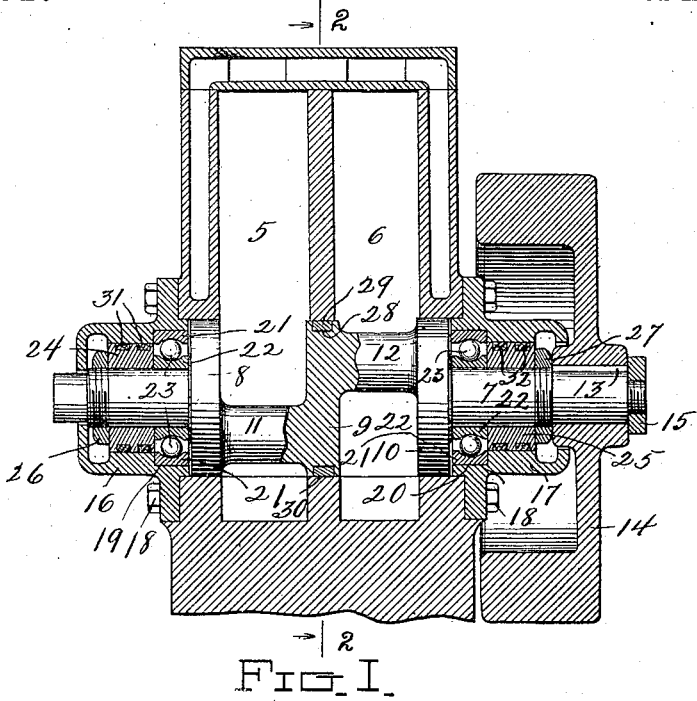
Figures 2, 3, 4:
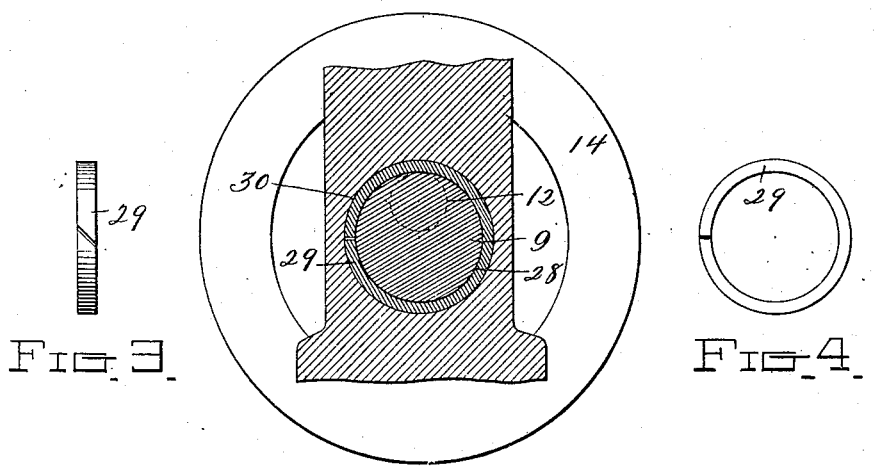

Further objects and advantages of the invention will be set forth in the detailed description which now follows:

In the accompanying drawing, Figure 1 is a partial sectional view, illustrating the method of mounting the crank shaft of a multiple cylinder two cycle engine, the pistons and connecting rods being omitted. Fig. 2 is a partial vertical section upon line 2—2 of Fig. 1, Fig. 3 is an edge view of a packing ring employed, and, Fig. 4 is a side elevation of said packing ring.

Like numerals designate corresponding parts in all of the figures of the drawing.

Referring to the drawing, the numerals 5 and 6 designate the cylinders of a two cycle internal combustion engine. The crank shaft 7 comprises crank disks 8, 9, and 10 between which the crank pins 11 and 12 are located. A key 13 secures a fly wheel 14 in position upon the shaft and a nut 15 aids in retaining both the fly wheel and the key in position. Housings 16 and 17 are secured in position by bolts 18. The housings are cut out at 19 and 20 for the reception of the ball race containing members 21, which together with the ball race containing members 22 and balls 23, provide ball bearings for the shaft. Mounted upon the crank shaft 7, outside of the ball bearings, are collars 24 and 25, said collars being keyed upon the shaft, or pinched between the nuts 26 and 27, and the inner ball races 22, with sufficient pressure to compel the collars to rotate with the shaft. The crank disks 8, 9 and 10 are all of substantially the same diameter, and it is apparent that the crank case may be bored out longitudinally, the opening between the cylinders being of the same diameter as the openings of the crank case. The central disk 9 is annularly grooved at 28 for the reception of a split ring 29. This ring is sprung into position within the bore 30 of the wall that divides the cylinders, and said ring floats in the groove 28. Corresponding rings 31 and 32 are located in grooves formed in the collars 24 and 25. The rings 31 and 32 effectually prevent leakage from the ends of the crank case, and the ring 28 prevents leakage of the combustible charge from one side of the crank disk 9 to the other. The various portions of the crank case are thus effectually cut off from each other without the employment of intermediate bearings, whereby a great saving in the cost of construction is secured.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

In a multiple cylinder engine, the combination with a body portion divided into a plurality of cylinders and a crank case, of a crank shaft comprising a plurality of crank disks of equal diameter, fitting within said crank case, one of said disks being located between two of the cylinders and having a peripheral groove, a resilient packing ring fitting within said groove and engaging the inner peripheral wall of the crank case between said cylinders, the diameter of said crank case being the same about each of said crank disks, whereby said crank case may be bored for the reception of all of said disks at one operation.

In testimony whereof I affix my signature in presence of two witnesses.

PERRY OKEY.

Witnesses:
H. P. CHANDLER,
C. P. BEACH.

Copies of this patent may be obtained for five cents each, by addressing the "Commissioner of Patents, Washington, D. C."